(No Model.)

C. A. BEERSTECHER.
CORN PLANTER.

No. 522,040. Patented June 26, 1894.

Witnesses:

Inventor
Charles A. Beerstecher
By Lucius C. West
Attorney.

UNITED STATES PATENT OFFICE.

CHARLES A. BEERSTECHER, OF CENTREVILLE, MICHIGAN.

CORN-PLANTER.

SPECIFICATION forming part of Letters Patent No. 522,040, dated June 26, 1894.

Application filed August 14, 1893. Serial No. 483,140. (No model.)

*To all whom it may concern:*

Be it known that I, CHARLES A. BEERSTECHER, a citizen of the United States, residing at Centreville, county of St. Joseph, State of Michigan, have invented a new and useful Wheel Hand Corn-Planter, of which the following is a specification.

The invention relates to that class of cornplanters which employ planter-wheels carrying the seed boxes.

The invention has for its object to produce a simple wheel-hand-planter containing certain improvements designed to increase its utility and economize in labor.

Figure 1:
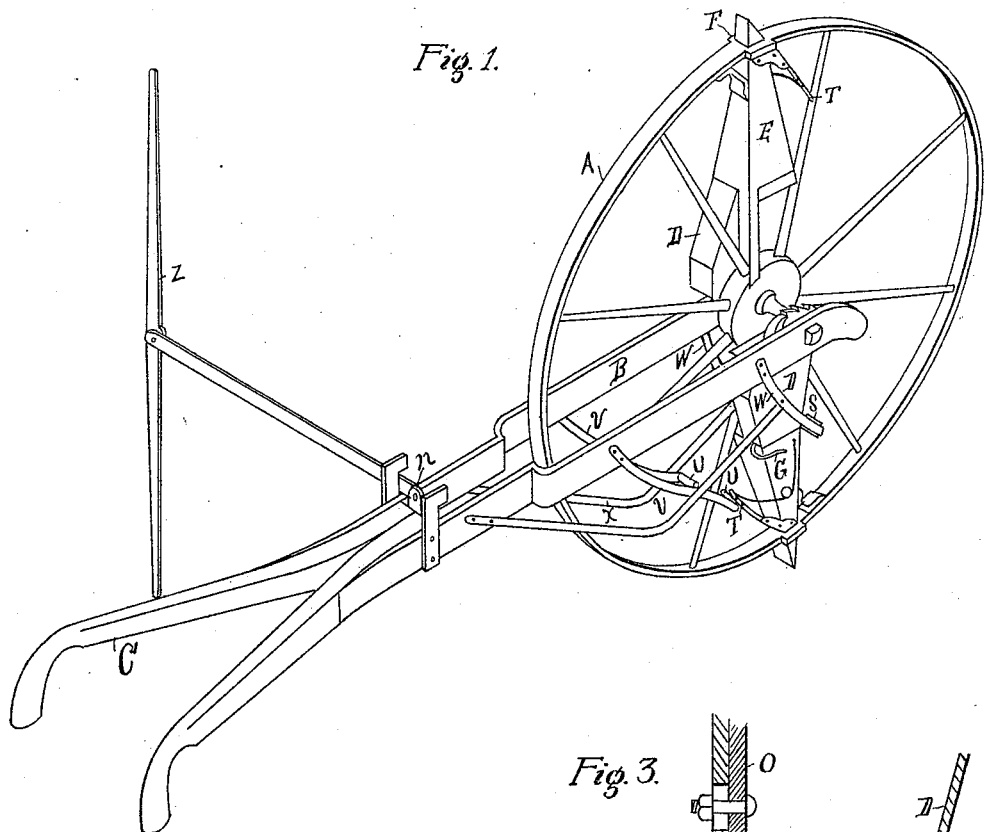
Figure 3:
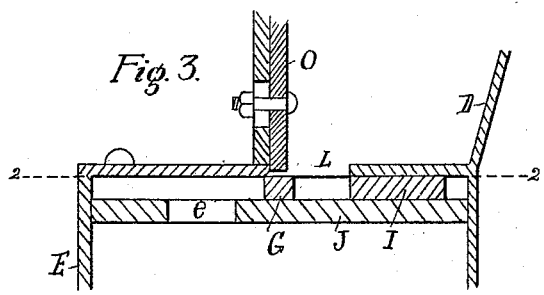
Figure 2:
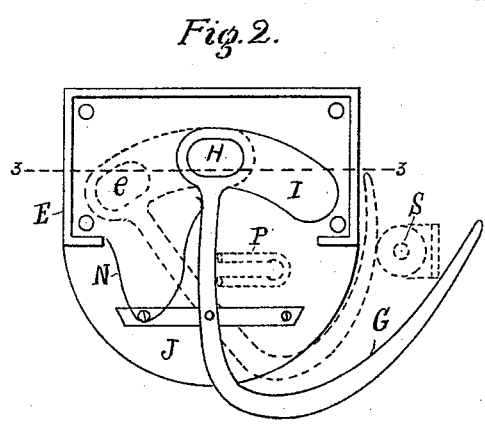

In the drawings forming a part of this specification Figure 1 is a perspective view of the planter complete; Fig. 2 a section on line 2—2 in Fig. 3; Fig. 3 a sectional elevation on line 3—3 in Fig. 2, enlarged; and Fig. 4 is a detail of Fig. 1, enlarged.

Referring to the lettered parts of the drawings, A is the planter-wheel, having revoluble bearings in one end of the frame, B. To the other end of said frame are attached handles, C, for propelling the planter by hand, like a wheelbarrow.

Figure 4:
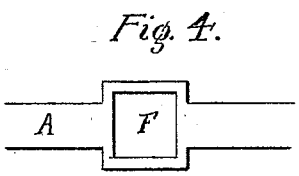

The seed boxes are composed of the upper compartment, D, and the lower compartment, E, jogged by each other where they join, Figs. 1 and 3, so that the upper compartment, D, will come on the outside of the hub and spokes of the wheel A, while the lower compartment, E, comes between the spokes, so as to pass through the enlarged hole, F, made centrally through the wheel rim, Fig. 4, and thus the row of corn will be planted in the track made by the wheel, so that the wheel may traverse the line made by the marker. Two seed boxes are employed, one on one side of the wheel and the other on the other side, so that their spade-ends which enter the ground are equidistant apart in either direction around the wheel, making the distance from one hill to the next hill a proper distance for the rows to be apart.

The dropping mechanism is located in the seed box, where the upper and lower parts join together. A U-shaped lever, G, is provided at the end of one of its arms with a pocket or hole, H, from which extends laterally an integral plate, I, Figs. 2 and 3. To a plate, J, in the seed box, the U-lever is pivoted, at a point between its bow and the pocket, H, so that when its free end, which extends around to the side of the seed box, is carried in or out, the pocket, H, will be swung laterally. To illustrate, the pocket, H, in its normal position is beneath the hole, L, through the bottom of the upper part, D, of the seed box, said upper part containing the corn. The pocket, H, is supposed to be filled with corn, which has passed down through the hole, L. By swinging the free end of the U-lever, G, inward, the pocket, H, is swung to a point directly over the delivery hole, e, in the plate, J, when the corn is delivered into the lower part, E, of the seed box, Fig. 3. The spring, N, swings the U-lever back to its normal position. The plate, I, of the pocket, H, during this action, keeps the hole L closed until the return of the pocket, H.

At O is a piece of rubber, attached in a vertically adjustable manner to one of the walls of the upper compartment, D, of the seed box, Fig. 3, at a point over the hole, L, so as to strike off the surplus corn from the pocket, H, when it passes beneath it, leaving it level full.

At P, Fig. 2, is shown an adjustable stop, in dotted lines, for limiting the swing of the U-lever in its return movement, so as to control the amount of corn planted in a hill; for instance, by presenting only a portion of the pocket, H, beneath the hole, L, less corn will enter than if more of the pocket were exposed.

The spade-ends of the seed boxes are provided with the ordinary hinged, spring-actuated doors for opening and closing like a jaw, in depositing the corn in the ground. This door and the U-lever, G, are both operated by the revolution of the wheel.

To illustrate, when the wheel revolves the free end of the U-lever, G, first comes in contact with the roller, S, said roller having bearings in the arm, W, pendent from the frame, B. The contact of the roller, S, with the U-lever, G, swings said U-lever on its pivot, as illustrated by dotted lines in Fig. 2, which action deposits the corn in the lower portion, E, of the seed box, through the hole, e. As the wheel continues to revolve, a projection, T, from the spring-actuated door of the spade-end of the seed box, comes in contact with a roller, U, which action opens said door and allows the corn to pass into the ground. This roller, U, has bearings in the lower end of an arm, V, pendent from the frame, B.

At X is a brace, attached to the arms W and V and to the frame, B. Of course the construction is alike on both sides of the planter-wheel.

The T-arm, Z, pivoted to the planter at n, constitutes the marker. It makes a mark at the proper distance from the planter when crossing the field in one direction. When returning, the T-arm, Z, is swung over on its pivot to the opposite side of the planter and the planter-wheel traverses the track previously made by the marker, while the marker makes another mark. Thus by the use of this planter the field does not have to be marked prior to planting, and has only to be marked in one direction during the operation of planting, thus saving much time and labor.

Attached to the wheel axle at c is a ratchet, and at i is a pawl, pivoted to the frame, B, in a position to engage said ratchet; the office of which is to prevent the wheel, A, from being turned in the wrong direction and thus preventing the rollers U S or their supporting arms, W V, from catching against the U-bar, G, and projection, T, on the wrong side.

This invention may be incorporated into a machine to be drawn by horses, if desired.

Having thus described my invention, what I claim as new, and desire to secure by Letters Patent of the United States, is—

1. The combination of a suitable frame, a planter-wheel having bearings in said frame and provided with holes centrally through the rim, said boxes carried by said wheel having the lower portions jogged by the upper portions and passed through said holes in the rim, dropping mechanism in said seed boxes, having the operating U-levers, with the outwardly projecting free ends, said seed boxes having the hinged door at the spade-end, arms pendent from said frame, said arms having the rollers in the lower end, with which the U-lever and the seed box door are brought in contact, to operate the same by the revolution of the wheel; substantially as set forth.

2. The combination of a suitable frame, a planter-wheel having suitable bearings therein, the two-part seed box having a chamber between the two parts where they join, a hole leading out of the upper compartment into said chamber, and a hole leading out of said chamber into the lower compartment, the pivoted, spring-actuated U-lever, provided with a seed pocket and a laterally extending plate at the inner end, the other end extending outwardly by the side of the box, and an arm pendent from said frame, bearing a roller at its free end, with which the free end of said U-lever is brought in contact to operate the same by the revolution of the wheel; substantially as set forth.

3. The combination of a suitable frame, having suitable handles at one end, a planter-wheel having bearings in the other end of said frame and provided with holes centrally through the rim, said boxes carried by said wheel having the lower portions jogged by the upper portions and passed through said holes in the rim, dropping mechanism in said seed boxes, having the operating U-levers, with the outwardly projecting free ends, said seed boxes having the hinged door at the spade-end, arms pendent from said frame, said arms having the rollers in the lower end, with which the U-lever and the seed box door are brought in contact, to operate the same by the revolution of the wheel, and a pawl and ratchet, preventing the planter-wheel from revolving in the wrong direction: substantially as set forth.

In testimony to the foregoing I have hereunto subscribed my name in the presence of two witnesses.

CHARLES A. BEERSTECHER.

Witnesses:
JOHN FARROW,
JOSEPHUS MOSHER.